UNITED STATES PATENT OFFICE.

ARTHUR LÜTTRINGHAUS AND HEINRICH von DIESBACH, OF MANNHEIM, GERMANY, ASSIGNORS TO BADISCHE ANILIN & SODA FABRIK, OF LUDWIGSHAFEN-ON-THE-RHINE, GERMANY, A CORPORATION OF GERMANY.

ORANGE-RED VAT DYE.

1,018,836. Specification of Letters Patent. Patented Feb. 27, 1912.

No Drawing. Application filed November 3, 1911. Serial No. 658,386.

*To all whom it may concern:*

Be it known that we, ARTHUR LÜTTRINGHAUS and HEINRICH VON DIESBACH, the first a subject of the King of Prussia and the second a citizen of the Swiss Republic, residing at Mannheim, Germany, have invented new and useful Improvements in Orange-Red Vat Dye, of which the following is a specification.

Our invention relates to a new coloring matter which we regard as a methyl-anthraquinone-thioxanthone of a constitution corresponding to the formula

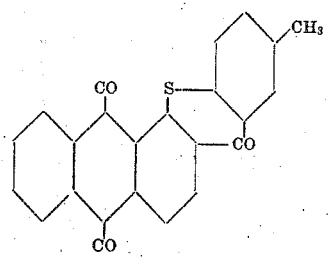

We can prepare our new coloring matter by first treating 1-chlor-anthraquinone-2-carboxylic acid with para-thio-cresol and then treating the product with a condensing agent such, for instance, as phosphorus pentachlorid, until a thioxanthone ring is formed.

Our new coloring matter consists, when dry, of a red powder, and, in the pure state, has a percentage composition corresponding to the above formula. It yields an intense carmine red solution in concentrated sulfuric acid, a violet vat in alkaline hydrosulfite solution, and dyes cotton from this vat orange-red shades of excellent fastness against the action of chlorin and light.

The following example will serve to illustrate further the nature of this invention, which, however, is not confined to this example. The parts are by weight. Boil together, for 3 hours, in a reflux apparatus, while excluding air, 29 parts of 1-chlor-anthraquinone-2-carboxylic acid, 12.4 parts of para-thio-cresol, 12 parts of caustic potash and 300 parts of water. Then filter and acidify the filtrate with dilute acetic acid. Filter off the para-tolyl-thio-1-anthraquinone-2-carboxylic acid and wash and dry it. It is an orange powder which yields a yellowish red solution in alkalis and a dull green solution in cold concentrated sulfuric acid, which solution rapidly turns brown-red. Introduce 10 parts of this para-tolyl-thio-1-anthraquinone-2-carboxylic acid into 130 parts of trichlor-benzene. Add 8 parts of phosphorus pentachlorid and heat the mixture, on the water-bath, until the formation of the acid chlorid is complete. Then boil for from 1 to 2 hours. On cooling, the anthraquinone-thioxanthone derivative separates out in the form of dark red needles. It yields a brownish solution in organic solvents of high boiling point, and an intense carmine red solution in concentrated sulfuric acid. It dissolves in alkaline hydrosulfite solution to a violet vat and dyes cotton orange-red shades of excellent fastness.

Now what we claim is:—

The vat coloring matter which possesses a percentage composition corresponding to the formula

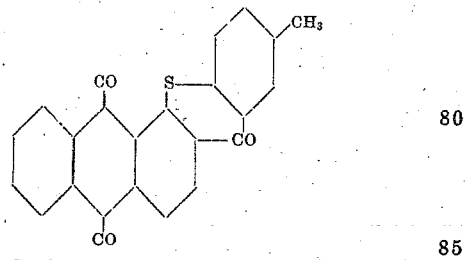

which coloring matter consists, when dry, of a red powder which yields a carmine red solution in concentrated sulfuric acid, a violet vat in alkaline hydrosulfite solution, and which dyes cotton from this vat orange-red shades of excellent fastness against the action of chlorin and light.

In testimony whereof we have hereunto set our hands in the presence of two subscribing witnesses.

ARTHUR LÜTTRINGHAUS.
HEINRICH von DIESBACH.

Witnesses:
J. ALEC. LLOYD,
JOSEPH PFEIFFER.